US010198185B2

(12) United States Patent
Park et al.

(10) Patent No.: US 10,198,185 B2
(45) Date of Patent: Feb. 5, 2019

(54) COMPUTING SYSTEM WITH PROCESSING AND METHOD OF OPERATION THEREOF

(71) Applicant: Samsung Electronics Co., Ltd., Suwon-si, Gyeonggi-Do (KR)

(72) Inventors: Dongchul Park, San Jose, CA (US); Yang Seok Ki, Palo Alto, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 99 days.

(21) Appl. No.: 14/749,298

(22) Filed: Jun. 24, 2015

(65) Prior Publication Data
US 2016/0188256 A1    Jun. 30, 2016

Related U.S. Application Data

(60) Provisional application No. 62/099,060, filed on Dec. 31, 2014.

(51) Int. Cl.
*G06F 3/06* (2006.01)

(52) U.S. Cl.
CPC ............ *G06F 3/0607* (2013.01); *G06F 3/067* (2013.01); *G06F 3/0661* (2013.01)

(58) Field of Classification Search
None
See application file for complete search history.

(56) References Cited

U.S. PATENT DOCUMENTS

| 7,730,244 B1 * | 6/2010 | Ansari ................. G06F 13/385 370/462 |
| 8,209,274 B1 * | 6/2012 | Lin ......................... G06N 3/08 706/21 |
| 8,489,817 B2 * | 7/2013 | Flynn ..................... G06F 1/183 711/103 |
| 8,819,335 B1 | 8/2014 | Salessi et al. |
| 8,825,937 B2 * | 9/2014 | Atkisson ............. G06F 12/0246 711/102 |
| 8,966,184 B2 * | 2/2015 | Atkisson ............. G06F 12/0804 711/103 |
| 9,141,527 B2 * | 9/2015 | Atkisson ............. G06F 12/0802 |
| 2002/0026473 A1 * | 2/2002 | Gourraud ............ H04M 3/4217 709/203 |
| 2003/0120593 A1 * | 6/2003 | Bansal .............. G06F 17/30873 705/39 |
| 2003/0233527 A1 * | 12/2003 | Kawasaki ......... H04W 52/0229 712/1 |

(Continued)

Primary Examiner — Henry Tsai
Assistant Examiner — Christopher A Bartels
(74) Attorney, Agent, or Firm — Perspectives Law Group, Corp.

(57) ABSTRACT

A computing system includes: a gateway block configured to generate a modified operation for communicating a request operation issued by a host device to access a storage device; and wherein the gateway block includes: a conversion block configured to generate a converted interface for converting an interaction interface included in the request operation to the interaction interface executable by the storage device, and a translation block, coupled to the conversion block, configured to generate a translated representation for translating an object representation included in the request operation to the object representation utilized in the storage device.

20 Claims, 7 Drawing Sheets

(56) References Cited

U.S. PATENT DOCUMENTS

| | | | |
|---|---|---|---|
| 2004/0107265 A1* | 6/2004 | Yasunaga | G06F 13/1673 709/213 |
| 2004/0205772 A1* | 10/2004 | Uszok | H04L 29/06 719/317 |
| 2009/0055157 A1* | 2/2009 | Soffer | G06F 15/7864 703/27 |
| 2009/0158248 A1* | 6/2009 | Linderman | G06F 9/505 717/106 |
| 2013/0124466 A1* | 5/2013 | Naidu | G06F 17/30575 707/610 |
| 2014/0129753 A1 | 5/2014 | Schuette et al. | |
| 2014/0172809 A1 | 6/2014 | Gardella et al. | |
| 2014/0317206 A1 | 10/2014 | Lomelino et al. | |

\* cited by examiner

COMPUTING SYSTEM WITH PROCESSING AND METHOD OF OPERATION THEREOF

CROSS-REFERENCE TO RELATED APPLICATION(S)

This application claims the benefit of U.S. Provisional Patent Application Ser. No. 62/099,060 filed Dec. 31, 2014, and the subject matter thereof is incorporated herein by reference thereto.

TECHNICAL FIELD

An embodiment of the present invention relates generally to a computing system, and more particularly to a system with processing mechanism.

BACKGROUND

Modern consumer and industrial electronics, such as computing systems, servers, appliances, televisions, cellular phones, automobiles, satellites, and combination devices, are providing increasing levels of functionality to support modern life. While the performance requirements can differ between consumer products and enterprise or commercial products, there is a common need for efficiently storing data.

Research and development in the existing technologies can take a myriad of different directions. Some homogeneously process data on disk-based storage. More specifically, many distributed storage systems runs on homogenous interfaces. Other distributed storage systems process data on cloud to store data.

Thus, a need still remains for a computing system with processing mechanisms for efficiently process data heterogeneously. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested more efficient solutions and, thus, solutions to these problems have long eluded those skilled in the art.

SUMMARY

An embodiment of the present invention provides a computing system, including: a gateway block configured to generate a modified operation for communicating a request operation issued by a host device to access a storage device; and wherein the gateway block includes: a conversion block configured to generate a converted interface for converting an interaction interface included in the request operation to the interaction interface executable by the storage device, and a translation block, coupled to the conversion block, configured to generate a translated representation for translating an object representation included in the request operation to the object representation utilized in the storage device.

An embodiment of the present invention provides a method of operation of a computing system, including: generating a converted interface with a gateway block for converting an interaction interface included in a request operation to the interaction interface executable by a storage device; generating a translated representation for translating an object representation included in the request operation to the object representation utilized in the storage device; and generating a modified operation including the converted interface, the translated representation, or a combination thereof for communicating the request operation issued by a host device to access the storage device.

An embodiment of the present invention provides a non-transitory computer readable medium including instructions for execution by a computer block, including: generating a converted interface for converting an interaction interface included in a request operation to the interaction interface executable by a storage device; generating a translated representation for translating an object representation included in the request operation to the object representation utilized in the storage device; and generating a modified operation including the converted interface, the translated representation, or a combination thereof for communicating the request operation issued by a host device to access the storage device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
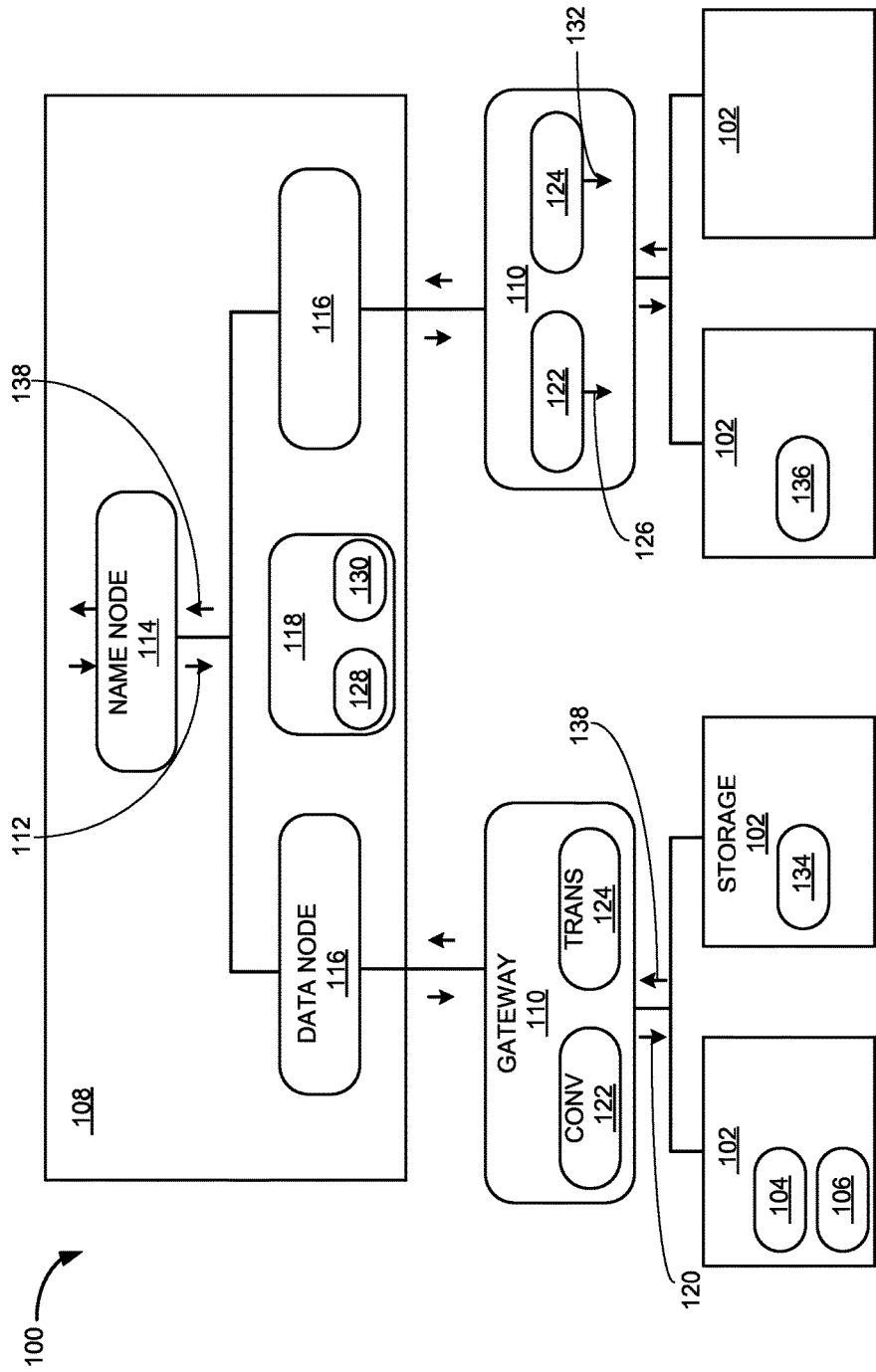
FIG. 1 is an architectural view of a computing system with a processing mechanism in a first embodiment of the present invention.

Various example embodiments include a computing system generating a modified operation by generating a converted interface, a translated representation, or a combination thereof to improve efficiency of a host device communicating with a storage device. By generating the modified operation, the host device can communicate with the storage device utilizing the language interface, the communication protocol, the object representation, or a combination thereof different from the host device. As a result, the host device can communicate the request operation seamlessly to obtain the operation result requested by the client.

Various example embodiments include a computing system generating a converted interface with a gateway block for converting an interaction interface included in a request operation to an interaction interface executable by the storage device, which can improve the efficiency of the host device communicating with the storage device. Also, the computing system can generate the translated representation for translating an object representation included in the request operation to the object representation utilized in the storage device. The host device can communicate with the storage device utilizing the interaction interface, even though the object representation utilized in the storage device is different from the host device. Furthermore, by the computing system generating the modified operation including the converted interface, the translated representation, or a combination thereof for communicating the request operation issued by the host device to access the storage device, the computing system can support devices supporting different instances of the language interface, the communication protocol, or a combination thereof. As a result, the computing system can improve the efficiency of the host device communicating with the storage device to obtain an operation result requested.

The following embodiments are described in sufficient detail to enable those skilled in the art to make and use the invention. It is to be understood that other embodiments would be evident based on the present disclosure, and that system, process, architectural, or mechanical changes can be made without departing from the scope of an embodiment of the present invention.

In the following description, numerous specific details are given to provide a thorough understanding of the various embodiments of the invention. However, it will be apparent that various embodiments may be practiced without these specific details. In order to avoid obscuring various embodiments, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation. The embodiments have been numbered first embodiment, second embodiment, etc. as a matter of descriptive convenience and are not intended to have any other significance or provide limitations for the present invention.

The term "module" referred to herein can include software, hardware, or a combination thereof in an embodiment of the present invention in accordance with the context in which the term is used. For example, a software module can be machine code, firmware, embedded code, and/or application software. Also for example, a hardware module can be circuitry, processor(s), computer(s), integrated circuit(s), integrated circuit cores, pressure sensor(s), inertial sensor(s), microelectromechanical system(s) (MEMS), passive devices, or a combination thereof. Further, if a module is written in the apparatus claims section, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown an architectural view of a computing system 100 with a processing mechanism in a first embodiment of the present invention. FIG. 1 depicts one embodiment of the computing system 100 where an In-Storage Computing (ISC) model is used. The term ISC can represent a storage device including a processor, memory storage, or a combination thereof.

For example, a storage device 102 can include a storage processor 104, a storage memory block 106, or a combination thereof. The storage device 102 can represent an example of the ISC model. The storage device 102 provides computing and storage capacity for processing a data. The storage processor 104 provides a compute engine for the storage device 102. The storage memory block 106 provides access to and stores the data.

For example, the storage memory block 106 can represent a random access memory (RAM) device or core. As a core, the storage memory block 106 can be integrated into a larger device (such as an integrated circuit device, a processor, an application specific standard product, an application specific integrated circuit, a system on a chip, or a combination thereof). The storage memory block 106 can include volatile memory, such as a dynamic random access memory (DRAM) or a static random access memory (SRAM). The storage memory block 106 can also comprise nonvolatile memory, such as a solid state flash memory.

The storage device 102 can interact with a number of interfaces, such as serial advanced technology attachment (SATA), serial attached small computer system interface (SAS), peripheral component interconnect express (PCI-E) interface, and various other interfaces, or a combination thereof. A host device 108 can offload functions, such as the MapReduce function, to the storage device 102. MapReduce can represent a program model for processing and generating large data sets with a parallel, distributed algorithm on a cluster.

The host device 108 interacts with a gateway block 110, the storage device 102, or a combination thereof. The host device 108 can issue a request operation 112 to access the data from the storage device 102. The request operation 112 can represent a command. Details will be discussed below.

The host device 108 can include a name node block 114, a data node block 116, or a combination thereof from a distributed file/storage system. The name node block 114 coordinates jobs, tasks, or a combination thereof. For example, a client can consult with the name node block 114 for a list of a plurality of the data node block 116 to store the data. The name node block 114 can be implemented with software, hardware, such as logic gates or circuitry (analog or digital), or a combination thereof. Also for example, the name node block 114 can be implemented with a hardware finite state machine, combinatorial logic, or a combination thereof.

The data node block 116 interacts with the gateway block 110 to store the data to the storage device 102. A plurality of the data node block 116 can form a cluster. The data node block 116 can be implemented with software, hardware, such as logic gates or circuitry (analog or digital), or a combination thereof. Also for example, the data node block 116 can be implemented with a hardware finite state machine, combinatorial logic, or a combination thereof.

The gateway block 110 interfaces between the host device 108 and the storage device 102. The gateway block 110 can bridge a difference of an interaction interface 118 between the host device 108 and the storage device 102. The interaction interface 118 can represent a programming language, a protocol, or a combination thereof. For example, the host device 108 can utilize the interaction interface 118 representing a programming language of Java™ while the storage device 102 can utilize the interaction interface 118 representing the programming language of C++. For example, the gateway block 110 can generate a modified operation 120 to allow the request operation 112 based off Java™ to be understood by the storage device 102 utilizing C++.

The modified operation 120 is a modified version of the request operation 112. The gateway block 110 can be implemented with software, hardware, such as logic gates or circuitry (analog or digital), or a combination thereof. Also for example, the gateway block 110 can be implemented with a hardware finite state machine, combinatorial logic, or a combination thereof. Details will be discussed below.

The gateway block 110 can include a conversion block 122, a translation block 124, or a combination thereof. The conversion block 122 can be implemented with software, hardware, such as logic gates or circuitry (analog or digital), or a combination thereof. Also for example, the conversion block 122 can be implemented with a hardware finite state machine, combinatorial logic, or a combination thereof. The translation block 124 can be implemented with software, hardware, such as logic gates or circuitry (analog or digital), or a combination thereof. Also for example, the translation block 124 can be implemented with a hardware finite state machine, combinatorial logic, or a combination thereof.

The conversion block 122 generates a converted interface 126 based on the interaction interface 118. The interaction interface 118 can represent a programming language, a protocol, or a combination thereof utilized by a device. For example, the interaction interface 118 used by the host device 108 can be different from the interaction interface 118 used by the storage device 102.

The interaction interface 118 can include a language interface 128, a communication protocol 130, or a combination thereof. The language interface 128 can represent a programming language, such as a high level language and/or script language executable by a device. The high level language can include Java™, C/C++, or C#, amongst others. The script language can include python, perl, or ruby, amongst others. For example, the host device 108 can execute the language interface 128 representing Java™ and the storage device 102 can execute the language interface 128 representing C/C++, thus, creating a mismatch in the language interface 128.

The communication protocol 130 can represent a method for multiple devices to communicate with each other. The communication protocol 130 can include small computer system interface (SCSI), advanced attachment technology (ATA), non-volatile memory express (NVMe), fibre channel (FC), hypertext transfer protocol (HTTP), HTTP Secure (HTTPS), RESTful, simple object access protocol (SOAP), proprietary protocols (e.g., key-value), or a combination thereof. For example, the host device 108 can use the communication protocol 130 representing HTTP and the storage device 102 can use the communication protocol 130 representing SCSI, thus creating a mismatch in the communication protocol 130. Details regarding the conversion block 122 generating the converted interface 126 will be discussed below.

The translation block 124 generates a translated representation 132 based on an object representation 134. The object representation 134 can represent a format for storing the data. The translated representation 132 can represent a modified version of the object representation 134. More specifically as an example, the object representation 134 used on the host device 108 can be different from the object representation 134 used on the storage device 102, thus, creating a mismatch. As a result, the translated representation 132 is needed for the storage device 102 to understand the object representation 134 requested in the request operation 112 issued by the host device 108.

The object representation 134 can include one or more identifiers, such as logical block address (LBA), page, uniform resource identifier (URI), object identification, key, other such identifiers, or a combination thereof. Details regarding the translation block 124 generating the translated representation 132 will be discussed below.

The gateway block 110 can communicate the modified operation 120 including the converted interface 126, the translated representation 132, or a combination thereof. The storage device 102 can execute an application 136 deployed inside the storage device 102 based on the modified operation 120 to return an operation result 138. The operation result 138 is an outcome from processing the modified operation 120. The storage device 102 can communicate the operation result 138 to the gateway block 110. The gateway block 110 can communicate the operation result 138 back to the host device 108.

Within the host device 108, the data node block 116 can receive the operation result 138 from the gateway block 110. The data node block 116 can communicate the operation result 138 to the name node block 114. The host device 108 can communicate the operation result 138 to a client initially requested the request operation 112.

The first embodiment of the present invention can illustrate the gateway block 110 communicating with a plurality of the storage device 102. For example, the plurality of storage device 102 can represent heterogeneous instances of various storage devices 102. The heterogeneous instances of the storage device 102 can represent one instance of the storage device 102 including the interaction interface 118 different from another instance of the storage device 102.

For a specific example, one instance of the storage device 102 can include the language interface 128 representing C++ while another instance of the storage device 102 can include the language interface 128 of Ruby. For another example, one instance of the storage device 102 can use the communication protocol 130 of SOAP while another instance of the storage device 102 can use the communication protocol 130 of HTTPs.

For further example, the gateway block 110 can (but need not necessarily) exist outside of the data node block 116. More specifically as an example, the gateway block 110 and the data node block 116 can have a one to one or many-to-one relationship, as will be illustrated below.

Figure 2:
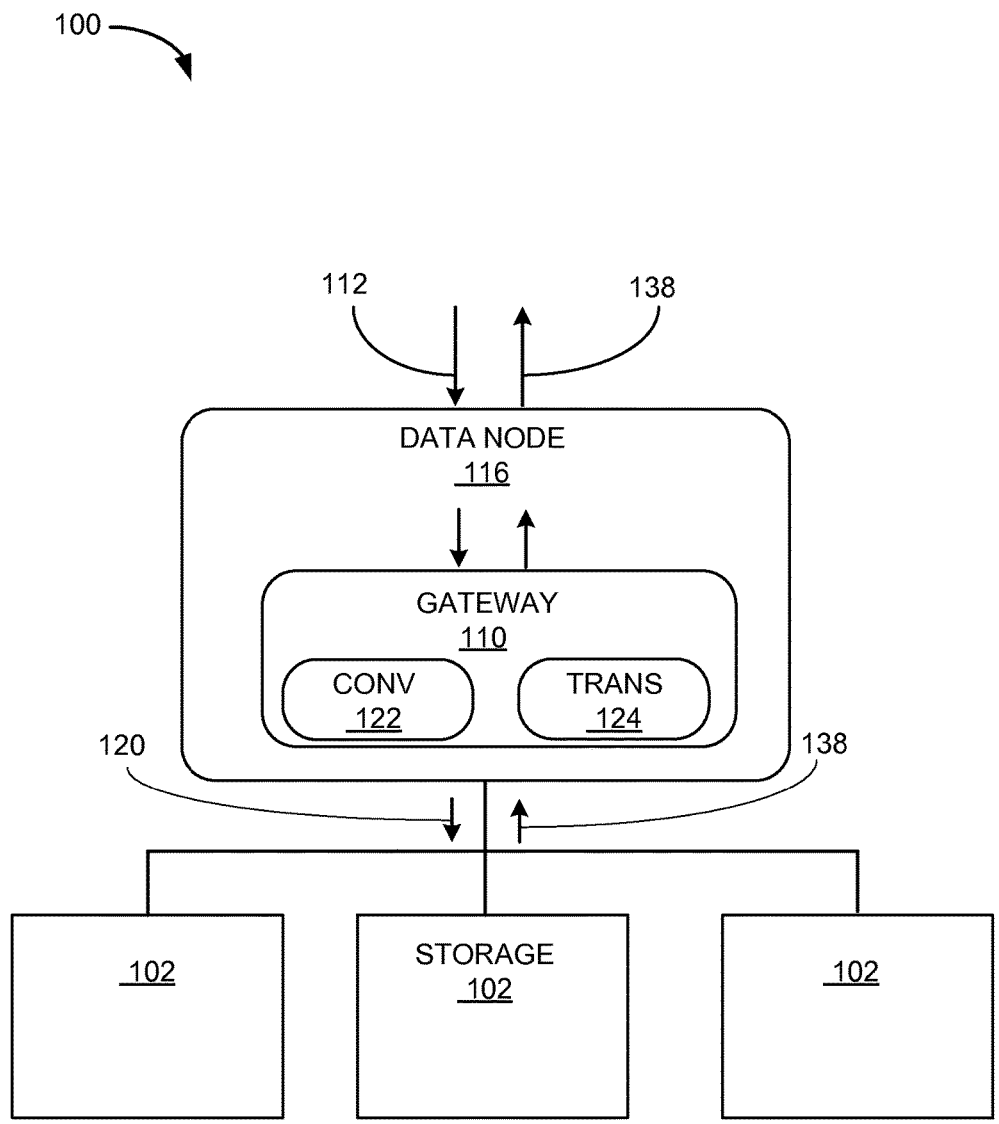
FIG. 2 is an architectural view of the computing system with the processing mechanism in a second embodiment of the present invention.

Referring now to FIG. 2, therein is shown an architectural view of the computing system 100 with the processing mechanism in a second embodiment of the present invention. The second embodiment of the present invention can include the data node block 116 including the gateway block 110, the conversion block 122, the translation block 124, or a combination thereof.

More specifically as an example, the data node block 116 can receive the request operation 112. The data node block 116 can communicate the modified operation 120 generated by the gateway block 110. For further example, the data node block 116 can communicate the modified operation 120 to a plurality of the storage device 102 representing heterogeneous instances of the storage devices 102. Each instances of the storage device 102 can communicate the operation result 138 back to the data node block 116.

Figure 3:
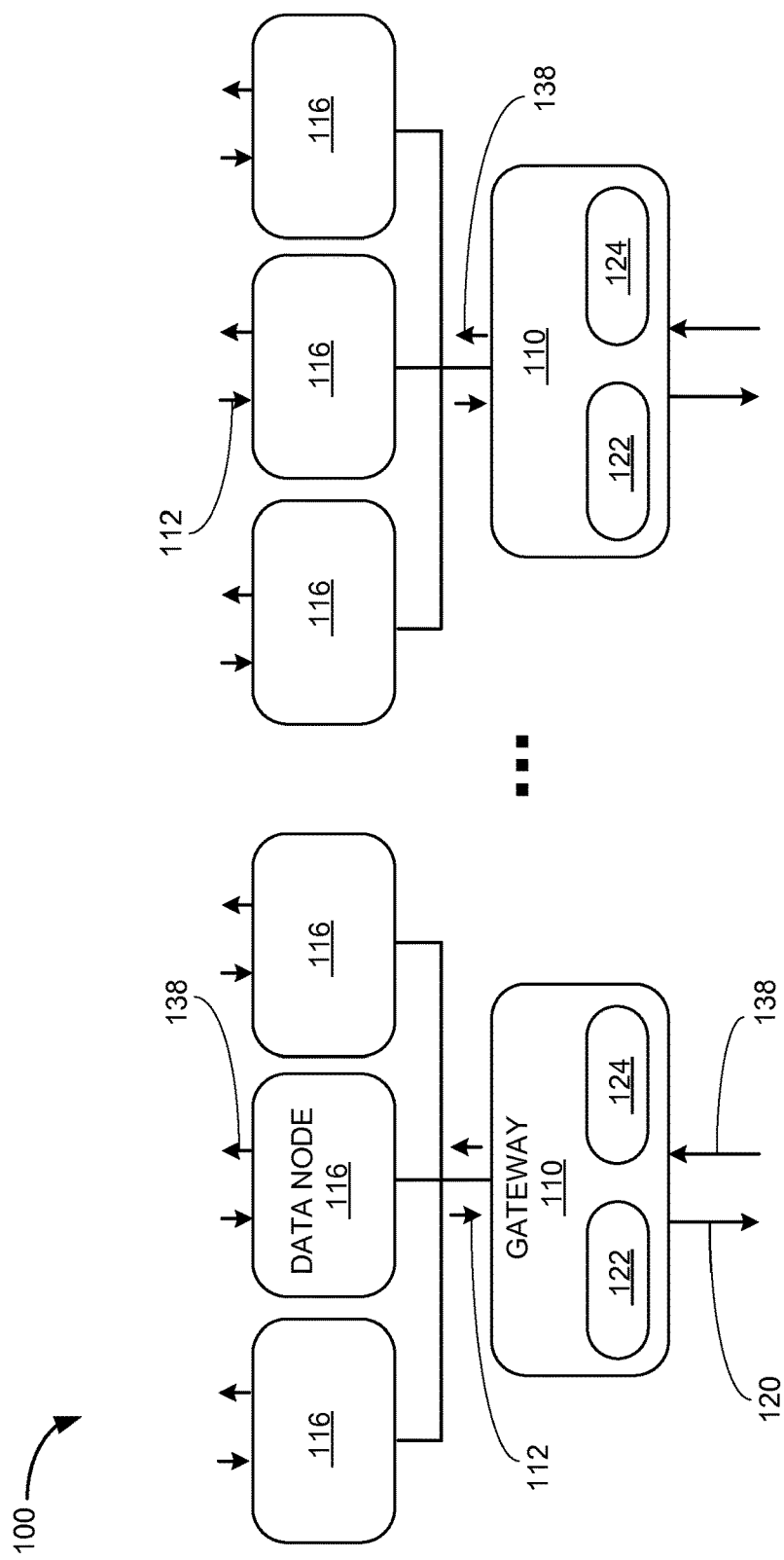
FIG. 3 is an architectural view of the computing system with the processing mechanism in a third embodiment of the present invention.

Referring now to FIG. 3, therein is shown an architectural view of the computing system 100 with the processing mechanism in a third embodiment of the present invention. The third embodiment of the present invention can illustrate the gateway block 110 including the conversion block 122, the translation block 124, or a combination thereof communicating with a plurality of the data node blocks 116. The gateway block 110 can exist independent from the data node block 116.

More specifically as an example, the gateway block 110 can receive various instances of the request operation 112 from each instances of the data node block 116. The gateway block 110 can generate the modified operation 120 per instance of the request operation 112 for communicating to the storage device 102 of FIG. 1. For further example, the gateway block 110 can communicate the operation result 138 from the storage device 102 to each instances of the data node block 116.

For further example, the third embodiment of the present invention can include a plurality of the gateway block 110. As discussed above, each instances of the gateway block 110 can communicate with a one or more of the data node block 116.

Figure 4:
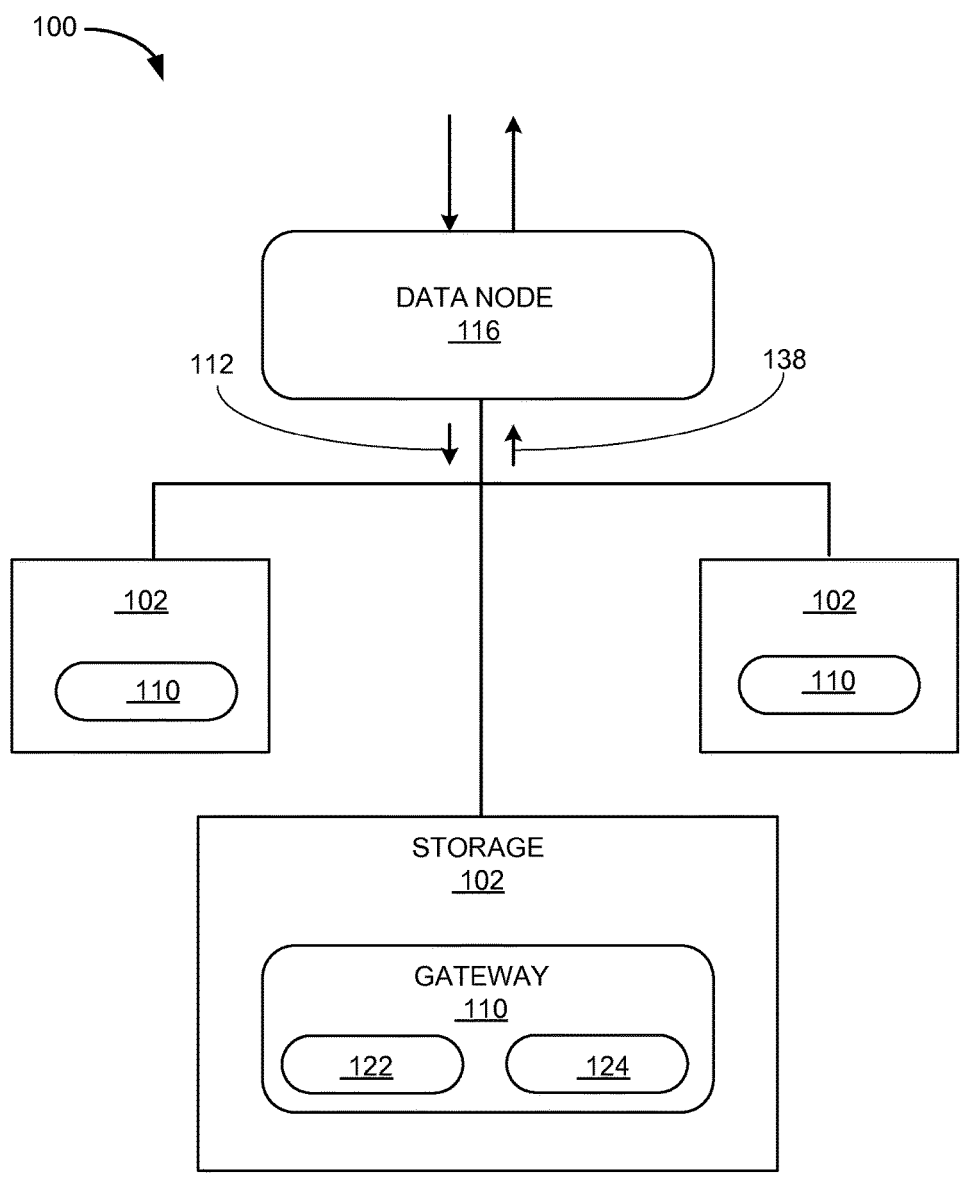
FIG. 4 is an architectural view of the computing system with the processing mechanism in a fourth embodiment of the present invention.

Referring now to FIG. 4, therein is shown an architectural view of the computing system 100 with the processing mechanism in a fourth embodiment of the present invention. The fourth embodiment of the present invention can illustrate the storage device 102 including the gateway block 110, the conversion block 122, the translation block 124, or a combination thereof.

More specifically as an example, the data node block 116 can communicate the request operation 112 directly to a plurality of the storage devices 102. The gateway block 110 can generate the modified operation 120 of FIG. 1 within the storage device 102 based on the request operation 112. The storage device 102 can communicate the operation result 138 based on the modified operation 120 to the data node block 116.

Figure 5:
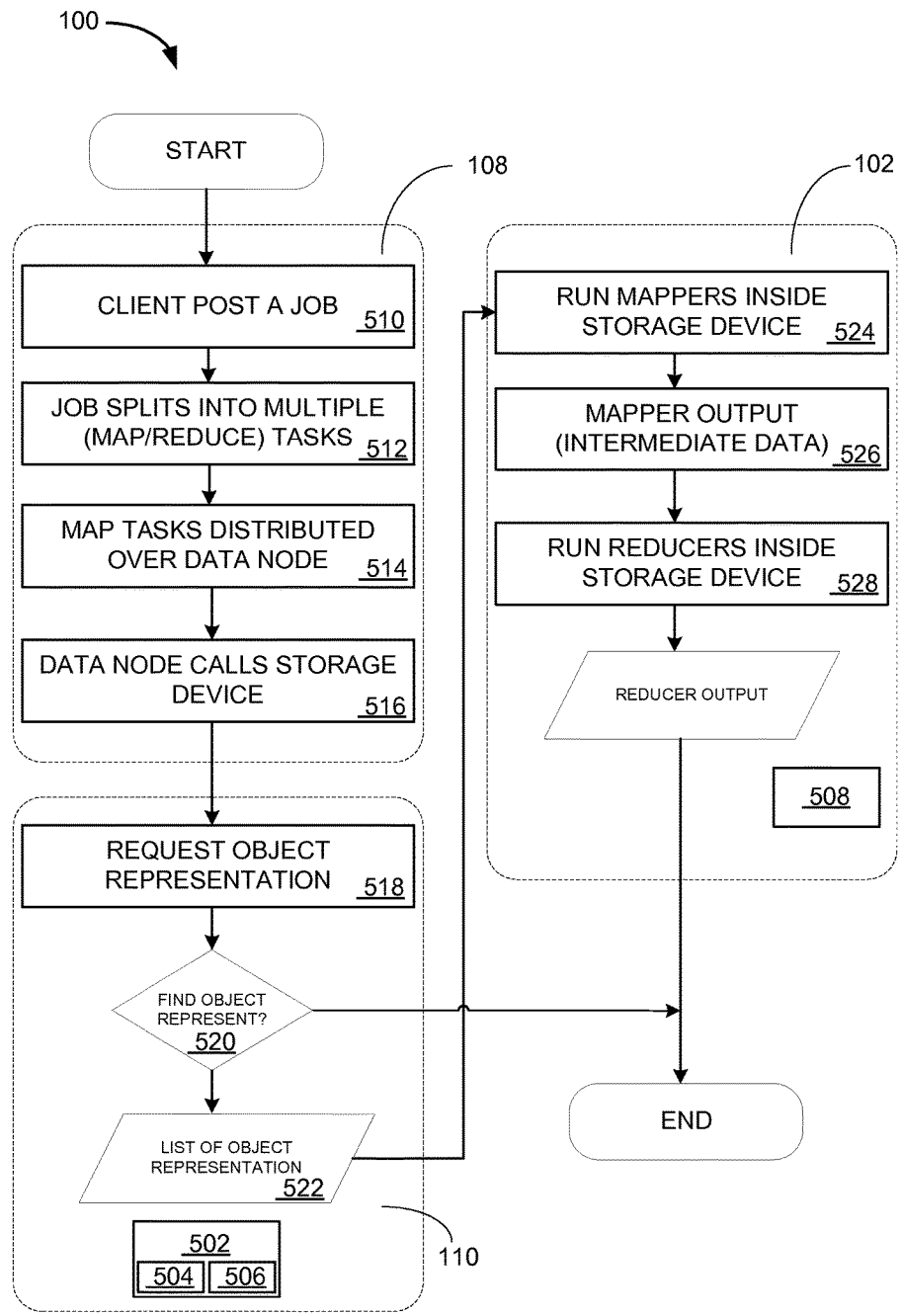
FIG. 5 is an example of a control flow of the computing system.

Referring now to FIG. 5, therein is shown an example of a control flow of the computing system 100. For example, the control flow can apply MapReduce function. However, the control flow can be described by applying different functions.

As discussed above, the host device 108 can receive the request operation 112 of FIG. 1 from a client. The name node block 114 of FIG. 1, the data node block 116 of FIG. 1, or a combination thereof within the host device 108 can process the request operation 112 via a function, such as a MapReduce function.

The gateway block 110 can receive the request operation 112 to generate the modified operation 120 of FIG. 1. The modified operation 120 can include the converted interface 126 of FIG. 1, the translated representation 132 of FIG. 1, or a combination thereof for the storage device 102 to understand the request operation 112.

The storage device 102 can execute the modified operation 120 within the application 136 of FIG. 1 deployed within the storage device 102. The storage device 102 can generate the operation result 138 of FIG. 1 to be communicated back to the gateway block 110, the host device 108, or a combination thereof.

The computing system 100 can include a gateway module 502. The gateway module 502 generates the modified operation 120 of FIG. 1. For example, the gateway module 502 can generate the modified operation 120 based on the request operation 112 of FIG. 1. The gateway module 502 can be executed by the host device 108 of FIG. 1, the gateway block 110 of FIG. 1, the storage device 102 of FIG. 1, or a combination thereof.

The gateway module 502 can generate the modified operation 120 in a number of ways. For example, the gateway module 502 can include a conversion module 504.

The conversion module 504 generates the converted interface 126 of FIG. 1. For example, the conversion module 504 can generate the converted interface 126 based on the interaction interface 118 of FIG. 1. The conversion module 504 can be executed by the conversion block 122 of FIG. 1.

The conversion module 504 can generate the converted interface 126 in a number of ways. For example, the conversion module 504 can generate the converted interface 126 by converting the language interface 128 of FIG. 1 for the data access by the host device 108 to the storage device 102. More specifically as an example, the conversion module 504 can generate the converted interface 126 based on language binding by converting the language interface 128 of the host device 108 to the language interface 128 of the storage device 102.

For a specific example, the language interface 128 for the host device 108 can represent Java™. The language interface 128 for the storage device 102 can represent C/C++. The conversion module 504 can generate the converted interface 126 by implementing Java™ Native Interface (JNI) between Java™ and C/C++ to convert Java™ into C/C++. As a result, the conversion module 504 can generate the converted interface 126 that allows the request operation 112 communicated by the host device 108 written in Java™ to be understood by the storage device 102.

For a different example, the conversion module 504 can generate the converted interface 126 by converting the communication protocol 130 of FIG. 1. More specifically as an example, the conversion module 504 can generate the converted interface 126 by converting the communication protocol 130 of the host device 108 representing HTTP or HTTPS to the communication protocol 130 of the storage device 102 representing ATA, SCSI, NVME, or FC. For a different example, the conversion module 504 can generate the converted interface 126 by converting the communication protocol 130 of the host device 108 to the communication protocol 130 representing web interfaces including HTTP, HTTPS, RESTful, SOAP, or a combination thereof or other interfaces, such as open source definition (OSD), or a proprietary protocol that the storage device 102 supports.

For further example, the conversion module 504 can check the communication protocol 130 of the host device 108 representing HTTP or HTTPS. The conversion module 504 can convert the request operation 112, such as PUT, GET, DELETE, or a combination thereof of HTTP or HTTPS protocol to command used in the storage device 108 including WRITE, READ, ERASE, or a combination thereof for SCSI.

For a specific example, the conversion module 504 can generate the converted interface 126 by mapping the communication protocol 130 used by the host device 108 to the communication protocol 130 used by the storage device 102. More specifically as an example, the conversion module 504 can map the instances of the communication protocol 130 by transforming data, command, representation of data/command, encoding, framing, or a combination thereof.

The gateway module 502 can include a translation module 506. The translation module 506 generates the translated representation 132 of FIG. 1. For example, the translation module 506 can generate the translated representation 132 based on the object representation 134 of FIG. 1. The translation module 506 can be executed by the translation block 124.

More specifically as an example, the object representation 134 used on the host device 108 can represent URI, filename, key, other identifier, or a combination thereof. The object representation 134 used on the storage device 102 can represent, LBA, object identification, other identifier, or a combination thereof. For a specific example, the translation module 506 can generate the translated representation 132 by converting the filename to the corresponding LBA range list.

For further example, the translation module 506 can check the object representation 134 of the data node block 116, which can represent a file name. The translation module 506 can generate the translated representation 132 by converting the file name into the object representation 134 used in the storage device 102. For example, the object representation 134 for the storage device 102 can represent the LBA range.

The translation module 506 can generate the translated representation 132 using an Application Program Interface (API) including fibmap, fiemap, or a combination thereof to obtain a block layout of the file on the storage device 102. The API can return the block range information, such as start LBA and end LBA, for the file occupying the storage device 102. The number of this block range information can be multiple sets according to the file size.

After collecting all block range information, the translation module 506 can convert the object representation 134 representing the file name of the host device 102 to the translated representation 132 representing a list of block range information. For example, the list of block range information can include a collection of a start LBA and end LBA. As a result, the gateway module 502 can generate the modified operation 120 to include the translated representation 132. The gateway module 502 can communicate the modified operation 120 including the converted interface 126, the translated representation 132, or a combination thereof to an execution module 508.

It has been discovered that the computing system 100 generating the modified operation 120 by generating the converted interface 126, the translated representation 132, or a combination thereof can improve the efficiency of the host device 108 communicating with the storage device 102. By generating the modified operation 120, the host device 108 can communicate with the storage device 102 utilizing the language interface 128, the communication protocol 130, the object representation 132, or a combination thereof different from the host device 108. As a result, the host device 108 can communicate the request operation 112 seamlessly to obtain the operation result 138 of FIG. 1 requested by the client.

The computing system 100 can include the execution module 508, which can be coupled to the gateway module 502. The execution module 508 executes the modified operation 120. For example, the execution module 508 can execute the modified operation 120 including the converted interface 126, the translated representation 132, or a combination thereof. The execution module 508 can be executed by the storage device 102.

More specifically as an example, the execution module 508 can execute the modified operation 120 to the application 136 of FIG. 1 deployed inside the storage device 102. Based on the modified operation 120, the application 136 can understand the request operation 112 to obtain the operation result 138 requested by the host device 108. The execution module 508 can communicate the operation result 138 to the host device 108, the gateway block 110, or a combination thereof.

It has been discovered that the computing system 100 generating the converted interface 126 with the gateway block 110 for converting the interaction interface 118 included in the request operation 112 to the interaction interface 118 executable by the storage device 102 improves the efficiency of the host device 108 communicating with the storage device 102. Also, by the computing system 100 generating the translated representation 132 for translating the object representation 134 included in the request operation 112 to the object representation 134 utilized in the storage device 102, the host device 108 can communicate with the storage device 102 utilizing the interaction interface 118, the object representation 134 different from the host device 108. Furthermore, by the computing system 100 generating the modified operation 120 including the converted interface 126, the translated representation 132, or a combination thereof for communicating the request operation 112 issued by the host device 102 to access the storage device 102, the computing system 100 can support devices supporting different instances of the language interface 128, the communication protocol 120, or a combination thereof. As a result, the computing system 100 can improve the efficiency of the host device 108 communicating with the storage device 102 to obtain the operation result 138 requested.

As discussed above, FIG. 5 illustrates the gateway block 110 including the gateway module 502 as an example. For a different example, the host device 108 can include the gateway module 502. For another example, the storage device 102 can include the gateway module 502.

For illustrative purposes, FIG. 5 includes blocks to illustrate the process flow from beginning to end as illustrated above. For example, the process flow can start by the client posting a job to the host device 108 at a block 510. The host device 108 can perform the MapReduce function to split the job into multiple tasks at a block 512. The host device 108 can map the tasks distributed over the data node block 116 at a block 514. The data node block 116 can call the storage device 102 to process the tasks at a block 516.

The gateway block 110 can request the object representation 134 stored in the storage device 102 for translating the object representation 134 sent along with the task from the host device 102 at a block 518. The gateway block 110 can search for the object representation 510 used in the host device 102 at a decision block 520. More specifically as an example, the list of instances of the object representation 134 can be found in a block 522.

If the object representation 134 used in the storage device 102 is not found at the decision block 520, the process flow can end. If the object representation 134 is found, the process flow can continue by the gateway block 110 sending the modified operation 120 to the storage device 102. The gateway module 502 can perform the functions described in the block 518, the decision block 520, the block 522, or a combination thereof.

The storage device 108 can run the mapper to map the translated representation 132 of the object representation 134 from the host device 108 to the object representation 134 stored on the storage device 102 at a block 524. The storage device 102 can generate an intermediate data as a result of mapping the translated representation 132 as discussed above at a block 526. The storage device 102 can further run reducers to generate the operation result 138 at a block 528. The execution module 508 can perform the functions described in the block 524, the block 526, the block 528, or a combination thereof.

Figure 6:
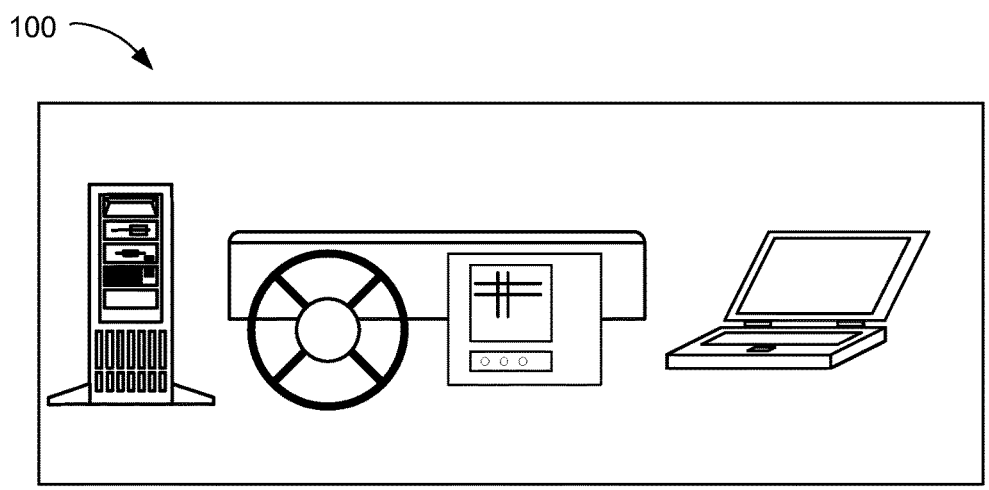
FIG. 6 is application examples of the computing system as with an embodiment of the present invention.

Referring now to FIG. 6, therein are application examples of the computing system 100 with an embodiment of the present invention. FIG. 6 depicts various embodiments, as examples, for the computing system 100, such as a computer server, a dash board of an automobile, a smartphone, a mobile device, and a notebook computer.

These application examples illustrate the importance of the various embodiments of the present invention to provide improved efficiency for processing data within heterogeneous architecture. The gateway block 110 of FIG. 1 can generate the modified operation 120 of FIG. 1 in order for the storage device 102 of FIG. 1 to understand the request operation 112 of FIG. 1 issued by the host device 108 of FIG. 1. The gateway block 110 can improve the efficiency of data communication between heterogeneous devices by generated the converted interface 126 of FIG. 1, the translated representation 132 of FIG. 1, or a combination thereof in order for the host device 108 and the storage device 102 to communicate with each other.

The computing system 100, such as the computer server, the dash board, and the notebook computer, can include a one or more of a subsystem (not shown), such as a printed circuit board having various embodiments of the present invention or an electronic assembly having various embodiments of the present invention. The computing system 100 can also be implemented as an adapter card.

Figure 7:
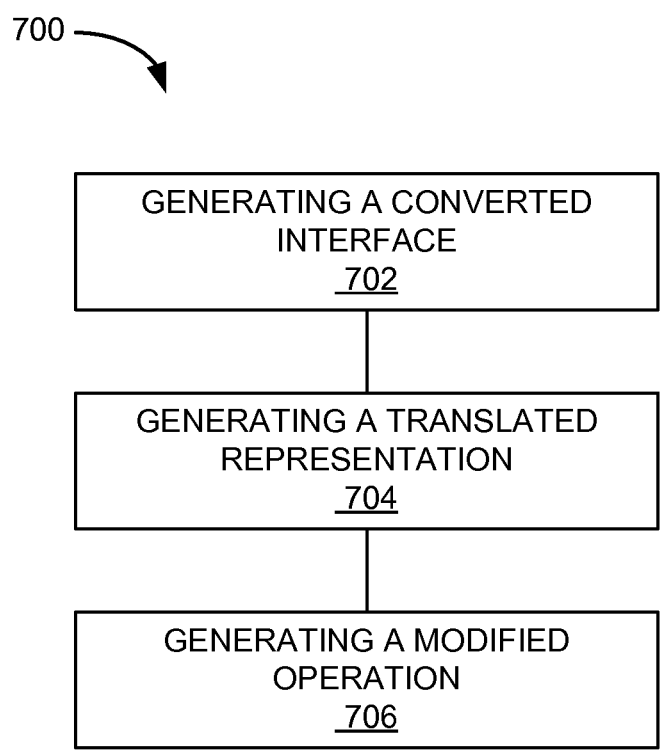
FIG. 7 is a flow chart of a method of operation of a computing system in an embodiment of the present invention.

Referring now to FIG. 7, therein is shown a flow chart of a method 700 of operation of a computing system 100 in an embodiment of the present invention. The method 700 includes: generating a converted interface with a gateway block for converting an interaction interface included in a request operation to the interaction interface executable by a storage device in a block 702; generating a translated representation for an object representation included in the request operation to an object representation utilized in the storage device in a block 704; and generating a modified operation including the converted interface, the translated representation, or a combination thereof for communicating the request operation issued by a host device to access the storage device in a block 706.

The block 702 can further include generating the converted interface for converting to a language interface executable by the storage device; and generating the converted interface can include generating the converted interface for converting to a communication protocol communicable with the storage device. The method 700 can further include sending an operation result for communicating the operation result, generated based on executing the modified operation by an application deployed within the storage device.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance. These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
    a gateway block configured to generate a modified operation for communicating a request operation issued by a host device to access a storage device after the host device performs a MapReduce function to split a job received from a client into tasks for mapping the tasks to be executed as the request operation to access the storage device; and
    wherein the gateway block includes:
        a conversion block configured to generate a converted interface for converting an interaction interface, representing a language interface including a high level programming language, from one instance of the high level programming language to a different high level programming language, included in the request operation to the interaction interface executable by the storage device including a storage processor, and
        a translation block, coupled to the conversion block, configured to generate a translated representation by converting an object name to a corresponding instance of a logical block address (LBA) range list for translating an object representation sent along with the tasks included in the request operation issued by the host device to the object representation utilized in the storage device.

2. The system as claimed in claim 1 wherein the conversion block is configured to generate the converted interface for converting the language interface of the request operation from the host device into the language interface executable by the storage device.

3. The system as claimed in claim 1 wherein the conversion block is configured to generate the converted interface for converting a communication protocol utilized for the request operation from the host device into the communication protocol communicable with the storage device.

4. The system as claimed in claim 1 wherein the gateway block is configured to receive an operation result for communicating the operation result generated based on executing the modified operation by an application deployed within the storage device.

5. The system as claimed in claim 1 further comprising a data node block including the gateway block configured to generate the modified operation for communicating the request operation issued by the host device to access the storage device.

6. The system as claimed in claim 1 further comprising the storage block including the gateway block configured to receive the request operation issued by the host device to access the storage device.

7. The system as claimed in claim 1 wherein the conversion block is configured to check a communication protocol for converting the request operation from the host device to a command used in the storage device.

8. The system as claimed in claim 1 wherein the translation block is configured to check the object representation to convert the translated representation for mapping the object representation of a data node block to the object representation of the storage device.

9. A method of operation of a computing system comprising:
    generating a converted interface with a gateway block for converting an interaction interface, representing a language interface including a high level programming language, from one instance of the high level programming language to a different high level programming language, included in a request operation to the interaction interface executable by a storage device including a storage processor;

generating a translated representation by converting an object name to a corresponding instance of a logical block address (LBA) range list for translating an object representation sent along with tasks included in the request operation issued by a host device to the object representation utilized in the storage device; and generating a modified operation including the converted interface, the translated representation, or a combination thereof for communicating the request operation issued by the host device to access the storage device after the host device performs a MapReduce function to split a job received from a client into the tasks for mapping the tasks to be executed as the request operation to access the storage device.

10. The method as claimed in claim 9 wherein generating the converted interface includes generating the converted interface for converting the language interface of the request operation from the host device into the language interface executable by the storage device.

11. The method as claimed in claim 9 wherein generating the converted interface includes generating the converted interface for converting a communication protocol utilized for the request operation from the host device into the communication protocol communicable with the storage device.

12. The method as claimed in claim 9 further comprising sending an operation result for communicating the operation result generated based on executing the modified operation by an application deployed within the storage device.

13. The method as claimed in claim 9 further comprising checking a communication protocol for converting the request operation from the host device to a command used in the storage device.

14. The method as claimed in claim 9 further comprising checking the object representation to convert the translated representation for mapping the object representation of a data node block to the object representation of the storage device.

15. A non-transitory computer readable medium including instructions for execution by a gateway block comprising:
generating a converted interface for converting an interaction interface, representing a language interface including a high level programming language, from one instance of the high level programming language to a different high level programming language, included in a request operation to the interaction interface executable by a storage device including a storage processor;

generating a translated representation by converting an object name to a corresponding instance of a logical block address (LBA) range list for translating an object representation sent along with tasks included in the request operation issued by a host device to the object representation utilized in the storage device; and generating a modified operation including the converted interface, the translated representation, or a combination thereof for communicating the request operation issued by a host device to access the storage device after the host device performs a MapReduce function to split a job received from a client into the tasks for mapping the tasks to be executed as the request operation to access the storage device.

16. The non-transitory computer readable medium as claimed in claim 15 wherein generating the converted interface includes generating the converted interface for converting the language interface of the request operation from the host device into the language interface executable by the storage device.

17. The non-transitory computer readable medium as claimed in claim 15 wherein generating the converted interface includes generating the converted interface for converting a communication protocol utilized for the request operation from the host device into the communication protocol communicable with the storage device.

18. The non-transitory computer readable medium as claimed in claim 15 further comprising sending an operation result for communicating the operation result generated based on executing the modified operation by an application deployed within the storage device.

19. The non-transitory computer readable medium as claimed in claim 15 further comprising checking a communication protocol for converting the request operation from the host device to a command used in the storage device.

20. The non-transitory computer readable medium as claimed in claim 15 further comprising checking the object representation to convert the translated representation for mapping the object representation of a data node block to the object representation of the storage device.

* * * * *